United States Patent

Ikeshima et al.

[11] Patent Number: 5,969,313
[45] Date of Patent: Oct. 19, 1999

[54] INHIBITOR SWITCH HAVING AN IMPROVED BEARING PORTION

[75] Inventors: Masahiro Ikeshima; Akira Iijima, both of Tokyo, Japan

[73] Assignee: Niles Parts Co., Ltd., Japan

[21] Appl. No.: 08/853,880

[22] Filed: May 9, 1997

[30] Foreign Application Priority Data

May 13, 1996 [JP] Japan .................................. 8-141120

[51] Int. Cl.$^6$ .................................................. H01H 9/06
[52] U.S. Cl. ............................................................ 200/61.88
[58] Field of Search ............................ 200/61.88, 61.85, 200/61.27, 61.28, 11 R, 11 J; 403/359.1, 359.6; 74/548

[56] References Cited

U.S. PATENT DOCUMENTS 5,525,768   6/1996   Cobb, III et al. ..................... 200/61.88
5,693,925  12/1997   Yamada et al. ....................... 200/61.88

FOREIGN PATENT DOCUMENTS 15-60257  10/1993  Japan .

*Primary Examiner*—Wynn Wood Coggins
*Assistant Examiner*—Michael J. Hayes
*Attorney, Agent, or Firm*—Rader, Fishman & Grauer; Ronald P. Kananen

[57] ABSTRACT

An inhibitor switch having a construction that facilitates fabrication by disposing a bearing surface made of a metal plate so as to be exposed at a bottom surface of a shaft hole to which a shaft of a movable plate is pivotably fitted, and having fixed contact plates formed in a pole plate by insertion molding. The movable plate has movable contacts, which are brought into contact with the fixed contact plates. A movable arm is secured to the movable plate. A case supports pivotably the movable plate together with the pole plate. The bearing surface made of a metal plate is disposed so as to be exposed at the bottom surface of the shaft hole to which the shaft of the movable plate is pivotably fitted. The bearing surface can be integral with one of the fixed contact plates.

12 Claims, 3 Drawing Sheets

INHIBITOR SWITCH HAVING AN IMPROVED BEARING PORTION

BACKGROUND OF THE INVENTION

1. Field of the Invention

The present invention relates generally to the construction of an inhibitor switch, in which contacts are changed depending on the position of a transmission operating member in an automatic transmission for an automobile and, in particular, to an improvement of the construction of a bearing portion for a movable plate in the inhibitor switch.

2. Description of the Related Art

A conventional inhibitor switch is disclosed, for example, in Japanese Utility Model Publication No. JP-A-Hei 7-25537. This conventional inhibitor switch includes a movable plate and a movable arm which are welded in one body by ultrasonic welding. A case and a pole plate of the inhibitor switch are fixed together by means of screws and so forth.

The conventional inhibitor switch described above is assembled in the following order. In a first step, a shaft of the movable arm is inserted into an O-ring and the case of the switch. In a second step, the movable plate is mounted on the shaft of the movable arm, and a joint portion therebetween is welded by ultrasonic welding. In a third step, contact springs and movable contacts are mounted on the movable plate. In a fourth step, the case is covered by the pole plate, and these two parts are secured to each other by means of screws and so forth.

However, the conventional inhibitor switch described above has a problem in that the mounting assembly is difficult because the ultrasonic welding is effected in a state where the case is put between the movable plate and the movable arm.

Further, the inhibitor switch has a problem in that the ultrasonic welding cannot be effected all around the case because the movable arm interrupts a horn of an ultrasonic welding machine when it is tried to further join the case and the pole plate by ultrasonic welding.

In addition, there is another problem in that the shaft of the movable arm can be inadvertently welded to the pole plate by ultrasonic welding. This is caused when the movable arm and the movable plate are joined by ultrasonic welding in a state where the movable plate is put pivotably between the case and the pole plate.

SUMMARY OF THE INVENTION

It is an object of the present invention to provide an inhibitor switch that solves the problems associated with the conventional inhibitor switch described above.

It is a further object of the present invention to provide an inhibitor switch having a construction wherein it is possible to join the movable arm and the movable plate by ultrasonic welding in a state where the movable plate is put pivotably between the case and the pole plate.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, an inhibitor switch is provided comprising: a pole plate in which fixed contact plates are formed by insertion molding; a movable plate having movable contacts which are brought into contact with the fixed contact plates; a movable arm secured to the movable plate; and a case supporting pivotably the movable plate together with the pole plate. In the pole plate of the inhibitor switch, a bearing surface made of a metal plate is exposed at a bottom surface of a shaft hole, to which a shaft of the movable plate is fitted.

The metal plate of the inhibitor switch is preferably one of the fixed contact plates disposed in one body in the pole plate.

A shaft portion of the movable arm is preferably welded to the shaft of the movable plate by ultrasonic welding, and the peripheral portion of the case is secured to the pole plate by ultrasonic welding.

Protruding portions are preferably formed on the shaft of the movable plate at a place where the shaft portion of the movable arm is engaged therewith, and recess portions engaging with the protruding portion are formed on the shaft portion. The protruding portions on the movable plate and the recess portions on the movable arm form a spline joint.

A displacement preventing hole is formed on each of the shafts of the movable plate at the center of an end surface. A ring-shaped protruding portion is formed on the case at the peripheral portion of the lower surface thereof, and a ring-shaped groove engaging with the ring-shaped protruding portion is formed on the pole plate. A displacement preventing groove is formed on the pole plate in a bottom surface portion of the ring-shaped groove.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
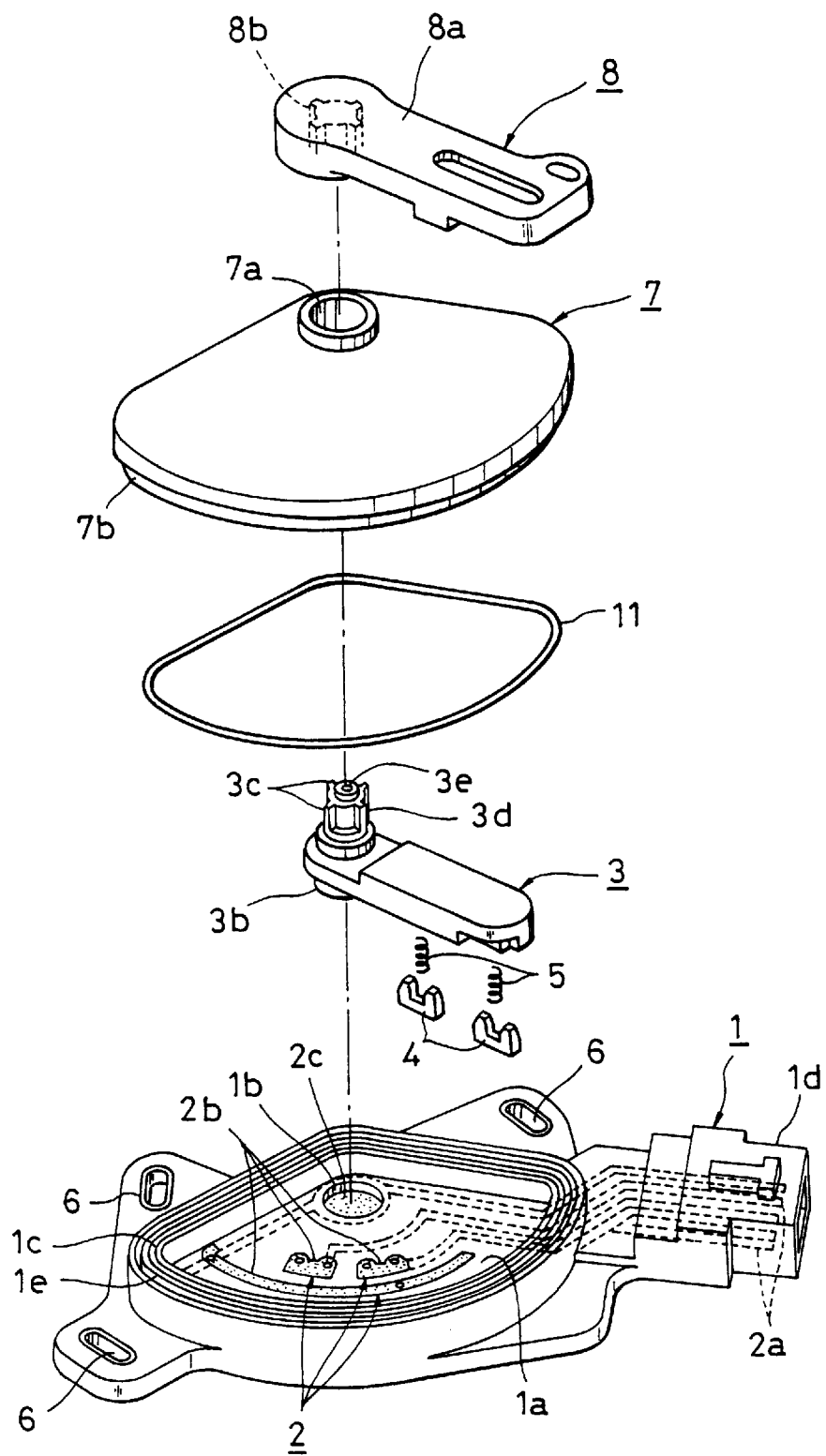
FIG. 1 is an exploded perspective view showing an inhibitor switch according to a preferred embodiment of the present invention.

A preferred embodiment of the present invention will now be described with reference to FIGS. 1 to 5 of the accompanying drawings.

Reference numeral 1 indicates a pole plate formed by inserting fixed contact plates 2, which are conductive metal plates, and metal rings 6 into a mold with resin. In the pole plate 1, a recess portion 1a accommodating pivotably a movable plate 3 around a shaft 3a, a shaft hole 1b to which a shaft 3b is pivotably fitted, and a connector portion 1d, in which terminals 2a of the fixed contact plates 2 are integrated, are formed in one body.

Figure 4:
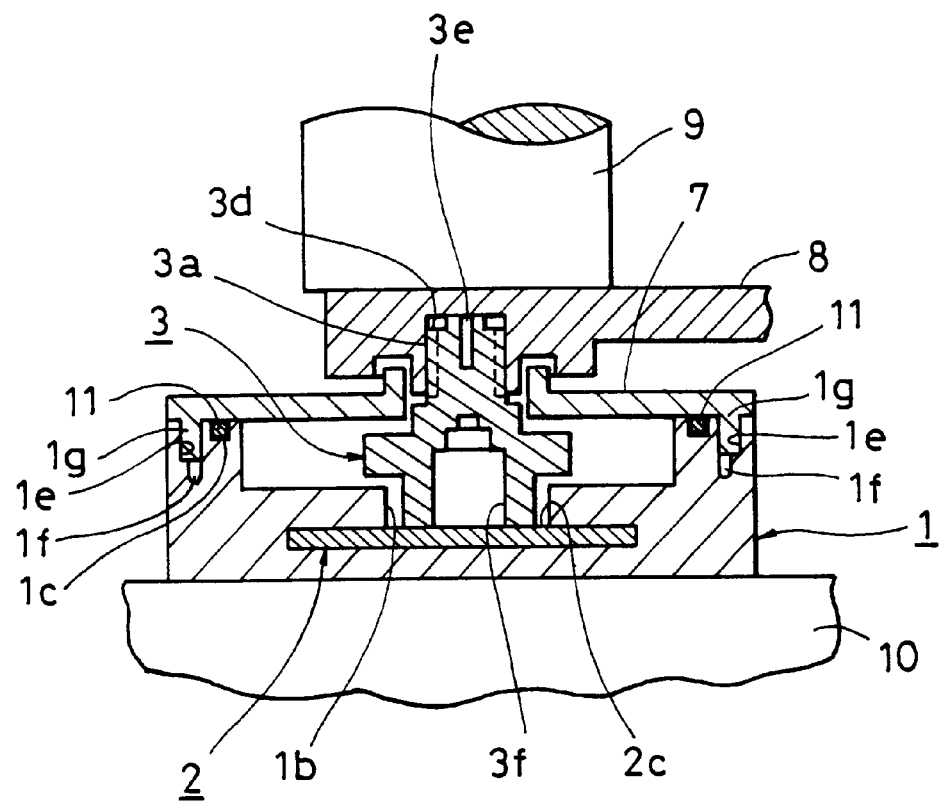
FIG. 4 is an enlarged cross-sectional view of a main part of the inhibitor switch.

The recess portion consists of a groove approximately folding-fan-shaped. On the bottom surface of the recess portion are disposed fixed contacts, which are brought into contact with a plurality of movable contacts 4. The shaft hole 1*b* is a circular blind hole formed in the surface portion of the recess portion 1*a*. As indicated in FIGS. 1 and 4, in the shaft hole 1*b*, a bearing surface 2*c* formed in a circular shape on a part of the fixed contact plate 2 is exposed at the bottom surface thereof. An insertion groove 1*c*, in which an O-ring 11 for improving air-tightness is disposed, is formed around the recess portion.

A ring-shaped groove 1*a* is provided to receive a ring-shaped protrusion 7*b* for ultrasonic welding formed along the periphery of the lower surface of the case 7. The ring-shaped groove 1*e* is adjacent to the insertion groove 1*c* outside thereof, and a displacement preventing groove 1*f* is formed in the surface portion thereof. An ultrasonic welding surface 1*g* is provided between the pole plate 1 and the case 7, which is a surface at which an outer side inner wall of the ring-shaped groove 1*e* is brought into contact with the ring-shaped protrusion 7*b*. The displacement preventing groove 1*f* prevents displacement from being produced in the neighborhood of the ring-shaped groove 1*e* of the case 7 during resin extrusion.

Figure 3:
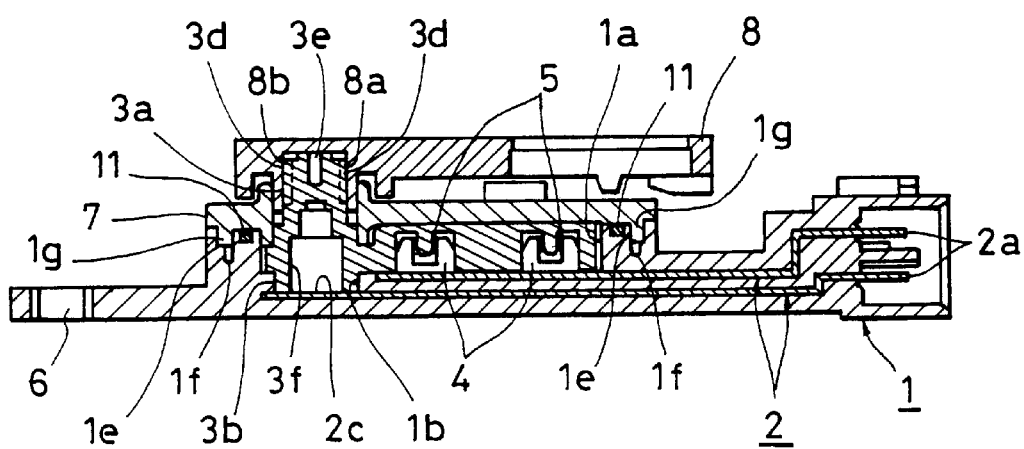
FIG. 3 is a cross-sectional view of the inhibitor switch according to the present invention.

The ring-shaped groove 1*e* forming the ultrasonic welding surface 1*g* may be either a groove, as indicated in FIGS. 1, 3 and 4, or a step-shaped groove, to which the outer side surface of the ring-shaped protruding portion 7*b* is fitted, and the shape thereof is not specifically restricted.

Figure 5:
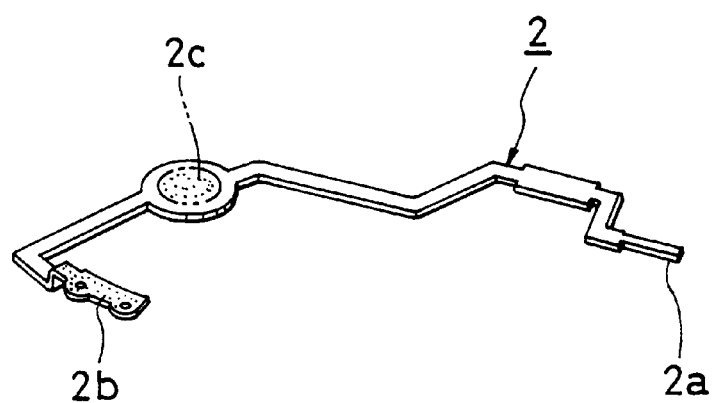
FIG. 5 is a perspective view of the fixed contact plate having a bearing surface according to the present invention.

There are a plurality of fixed contact plates 2. A terminal 2*a* of each of the fixed contact plates 2 protrudes into the connector portion 1*d* and a fixed contact, which is the other end thereof, is exposed on the bottom surface of the recess portion 1*a*. An arbitrary one of the fixed contacts 2*b* forms the bearing surface 2*c* between the terminal 2*a* and the fixed contact 2*b*, as indicated in FIG. 5.

Figure 2:
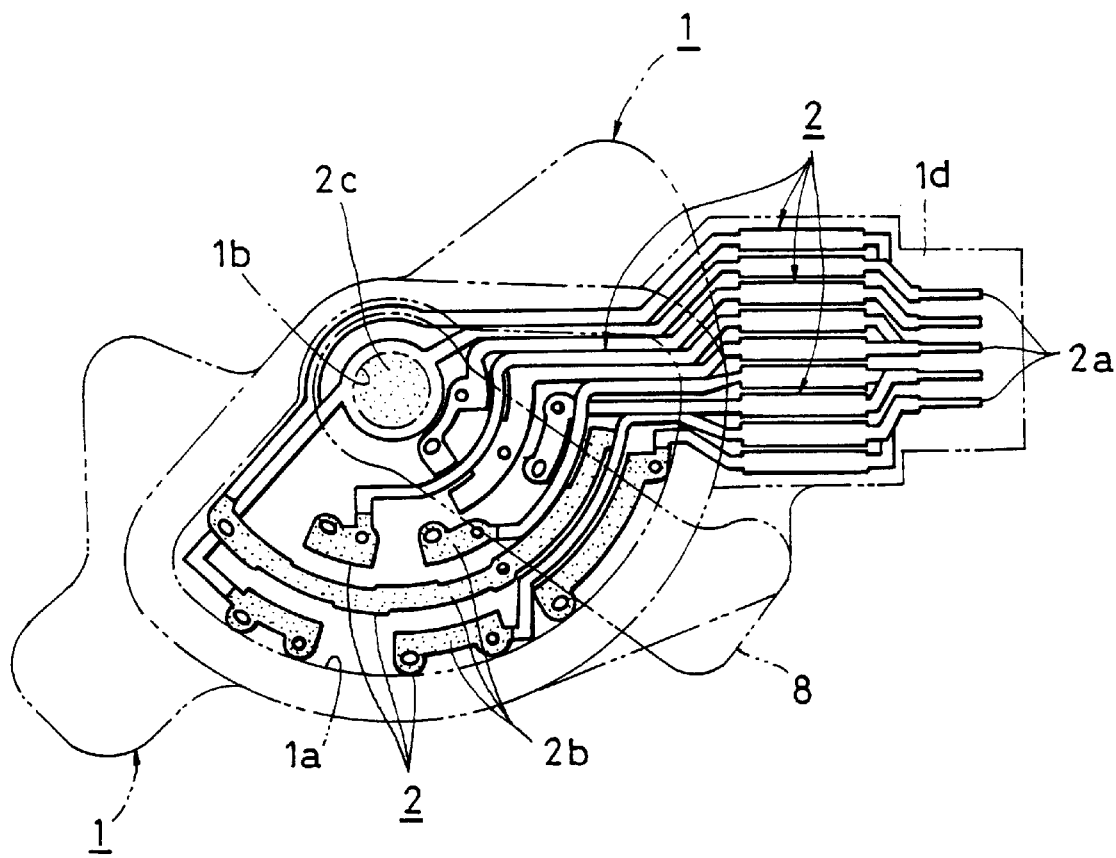
FIG. 2 is a plan view of a fixed contact plate assembly of the inhibitor switch according to the present invention.

The bearing surface 2*c* is formed by one of the plurality of fixed contact plates 2 formed in the pole plate 1 by insertion molding, as indicated in FIG. 2, which is arranged in the neighborhood of the shaft hole 1*b*. Further, the bearing surface 2*c* may be formed by means of a member such as a metal plate other than the fixed contact plate 2. It is sufficient for the bearing surface 2*c* to be in the pole plate 1 and to have a melting point different from that of the resin material of which the pole plate is made.

On the lower surface of the movable plate 3 there are arranged movable contacts 4 and contact springs 5. Shafts 3*a* and 3*b* protrude upward and downward, respectively, at one end of the movable plate 3 and are formed integral with the movable plate 3 with resin. The lower shaft 3*b* of the movable plate 3 is fitted pivotably to the shaft hole 1*b*. The upper shaft 3*a* is engaged with the shaft portion 8*a* of the movable arm 8 by insertion, passing through a through-hole 7*a* formed in the case 7. The ultrasonic welding surface 3*d* on an extremity of the shaft 3*a* of the movable plate 3, which is an engaging portion with the shaft portion 8*a*, is welded to the movable arm 8 in one body, as indicated in FIG. 4.

Protruding portions 3*c* for engaging with recess portions 8*b* on the shaft portion 8*a* of the movable arm 8 are formed in the peripheral portion of the shaft 3*a* of the movable plate 3. A displacement preventing hole 3*e* is formed at an extremity of the shaft 3*a*, as indicated in FIG. 1. The shaft 3*b* is a cylindrical shaft formed on the lower surface of the movable plate 3. The diameter of the shaft 3*b* is greater than that of the shaft 3*a*. A displacement preventing hole 3*f* is formed at the center of the lower surface of the shaft 3*b*, which is mounted in such a state that the periphery of the lower surface is in contact with the bearing surface 2*c* of the fixed contact plate 2.

The protruding portions 3*c* and the recess portions 8*b* are formed in a spline, an involute serration, or the like, and the engaging surface between the protruding portions 3*c* and the recess portions 3*b* is an ultrasonic welding surface 3*d*. The protruding portions 3*c* and the recess portions 8*b* prevent the movable arm 8 from being rotated with respect to the movable plate 3. The protruding portions 3*c* and recess portions 8*b* also play a role of positioning the movable arm 8 and the movable plate 3 at a predetermined angular position with respect to each other. The displacement preventing holes 3*e* and 3*f* are blind holes or through-holes, which prevent displacement at the extremities of the shafts 3*a* and 3*b* when the movable plate 3 is formed by extrusion with resin.

The movable contacts 4 are inserted into a lower surface portion of the movable plate 3 through contact springs 5. The rings 6 are formed by insertion molding in the pole plate 1 in such a state that they are engaged with peripheries of screw insertion holes, through which screws pass, when the pole plate 1 is secured to the automatic transmission by means of screws. The rings 6 are made of a band-shaped metal member and arranged in such a state that they are stuck to the inner walls of the oval-shaped screw insertion holes.

The case 7 is a cover member made of resin, on which the ring-shaped protruding portion 7*b* fitted to the recess portion 1*a* of the pole plate 1 is formed in the neighborhood of the periphery of the lower surface thereof. The ring-shaped protruding portion 7*b* is engaged with the ring-shaped groove 1*e* and secured to the ring-shaped groove 1*e* at the ultrasonic welding surface 1*g*, which is in contact therewith. The movable plate 8 is made of resin, one end of which is secured to the shaft 3*a*, while the other end is linked to the automatic transmission. In FIG. 4, reference numeral 9 represents a horn of the ultrasonic welding machine and 10 indicates a receiving portion therefor.

The bearing relation between the movable arm 8 and the shaft 3*a* of the movable plate 3, as well as the shaft of the shaft portion 8*a* as described above, may be reversed. That is, the shaft 3*a* protruding downward may be formed on the movable arm 8 at the position of the blind hole in the shaft portion 8*a*, and the shaft portion 8*a* to which the shaft 3*a* is fitted may be formed at the position where the shaft 3*a* is formed on the movable plate 3. Then the movable plate 3 and the movable arm 8 are secured to each other by ultrasonic welding.

Further, the shaft 3*b* may be an extremity portion of a shaft rod formed so as to protrude at the position of the blind hole in the shaft portion 8*a* of the movable arm 8. In this case, the shaft rod formed on the movable arm 8 is made to pass through the through-hole 7*a* formed in the case and the through-hole formed in the movable plate 3, and the extremity thereof is supported pivotably at the shaft hole 1*b*. Then the movable plate 3 and the movable arm 8 are secured to each other by ultrasonic welding.

The preferred embodiment of the present invention is constructed as described above, and an operation thereof will be described below in detail together with a mounting procedure.

In a first step, the fixed contact plates 2, which are formed by a press into a predetermined shape, are mounted on the pole plate 1 by insert formation.

In a second step, the movable contacts 4 and the contact springs 5 are inserted into the movable plate 3 which is formed by extrusion with resin. The movable plate 3 is inserted into the recess portion 1*a*, and the shaft 3*b* is engaged pivotably with the shaft hole 1*b*. The shaft 3*a* is made to pass through the through-hole 7*a*. The O-ring 11 is inserted into the insertion groove 1c. The case 7 is engaged with the recess portion 1a and, at the same time, the ring-shaped protruding portion 7b is engaged with the ring-shaped groove 1e.

In a third step, the pole plate 1 is mounted on the receiving portion 10 of the ultrasonic welding machine, as indicated in FIG. 4. The horn 9 is brought into contact with the periphery of the case 7 engaged with the pole plate, and the periphery of the case is secured to the pole plate 1 by ultrasonic welding. At this time, the ultrasonic welding surface 1g, where the ring-shaped protruding portion 7b is in contact with the ring-shaped groove 1e, is melted, and the pole plate 1 and the case 7 are welded to each other. Since there is the displacement preventing groove 1f at the bottom surface of the ring-shaped groove 1e, displacement produced when the pole plate 1 is formed by extrusion with resin is prevented, and it is possible to store resin melted during ultrasonic welding. In this way, the molten resin is prevented from flowing out inside and outside the pole plate 1 and, thus, from sticking to the fixed contacts 2b or the movable contacts 4, which gives rise to contact defects.

At ultrasonic welding, since the movable arm 8 is not mounted on the shaft, there is no hindrance to ultrasonic welding work on the case 7, which makes it possible to effect ultrasonic welding all around the case 7, and the ultrasonic welding work is easy. Since the case 7 is secured to the pole plate 1 along the entire periphery by ultrasonic welding and hermetically sealed by means of the O-ring 11, tightness of the pole plate 1 can be improved. Since the shaft hole 1b to which the shaft 3b is pivotably fitted is a blind hole, water-tightness of the pole plate 1 and the case 7 can be improved.

In a fourth step, the shaft portion 8a of the movable arm 8 is engaged with the shaft 3a of the movable plate 3. The pole plate 1 is mounted on the receiving portion 10 of the ultrasonic welding machine, as indicated in FIG. 4, and the horn 9 is set on the shaft portion 8a of the movable arm 8. The shaft portion 8a is secured to the shaft 3a by ultrasonic welding. The mounting is finished in this way.

There are the movable arm 8, the shafts 3a and 3b, the fixed contact plates 2, and the pole plate 1 between the horn 9 effecting ultrasonic welding and the receiving portion 10, as indicated in FIG. 4. The movable plate 8, the shaft 3a and 3b, and the pole plate 1 are made of resin and the fixed contact plates 2 are made of metal. For this reason, when ultrasonic welding is effected in the state indicated in FIG. 4, the shaft portion 8a of the movable arm 8 and the shaft 3a made of resin having a low melting point are welded to each other. Since the fixed contact plates made of metal have a high melting point, they are not melted and, therefore, do not stick to the shaft 3b.

Since all the parts of the inhibitor switch according to the present invention can be mounted in upward and downward directions, automatic mounting thereof by means of a machine can be realized easily and the construction thereof is suitable for mass production. Since ultrasonic welding can be effected at two places between the pole plate 1 and the case 7 and between the shaft 3a and the movable arm 8, the number of mounting steps can be decreased and, therefore, it is possible to reduce fabrication cost.

For example, in the case where an automatic transmission is operated thereby, the movable arm 8 is rotated around the shafts 3a and 3b together with the movable plate 3. Since the shaft 3b is rotated on the bearing surface 2c of the fixed contact plate 2, resistance to wear and durability can be improved.

Since an inhibitor switch according to the present invention is constructed as explained above, the following effects can be obtained.

(1) By an inhibitor switch according to the present invention comprising a pole plate, in which fixed contact plates are formed by insertion molding; a movable plate having movable contacts, which are brought into contact with the fixed contact plates; a movable arm secured to the movable plate; and a case supporting pivotably the movable plate together with the pole plate, owing to the fact that in the pole plate a bearing surface made of a metal plate is disposed so as to be exposed at a bottom surface of a shaft hole, to which a shaft of the movable plate is pivotably fitted, it is possible to weld only an upper portion of the shaft when the shaft and the movable arm are joined to each other by ultrasonic welding and to improve resistance to wear and durability of a bearing portion.

(2) By having the metal plate of the present invention being one of the fixed contact plates disposed in one body in the pole plate, a part of the fixed contact plates can be utilized with a high efficiency.

(3) By having a shaft portion of the movable arm welded to the shaft of the movable plate by ultrasonic welding and the peripheral portion of the case secured to the pole plate by ultrasonic welding, since all the parts of the inhibitor switch can be mounted in upward and downward directions, automatic mounting thereof by means of a machine can be realized easily and the construction thereof is suitable for mass production. Further, since ultrasonic welding can be effected at two places between the pole plate and the case and between the shaft and the movable arm, the number of mounting steps can be decreased and therefore it is possible to reduce fabrication cost.

(4) By having protruding portions formed on the shaft of the movable plate at a place where the shaft portion of the movable arm is engaged therewith and recess portions engaging with the protruding portions formed on the shaft portion, the shaft of the movable plate can be secured to the shaft portion of the movable arm at a predetermined angular position.

(5) Since the protruding portions on the movable plate and the recess portions on the movable arm form a spline joint, the shaft and the shaft portion can be positioned in a state where they are incapable of rotating with respect to each other. In addition, when the shaft and the shaft portion are joined to each other by ultrasonic welding, the ultrasonic welding surface is easily melted so that good ultrasonic welding can be attained.

(6) Since a displacement preventing hole is formed on each of the shafts of the movable plate at the center of an end surface, it is possible to prevent displacement when the movable plate is formed by extrusion with resin or when the shaft and the movable arm are joined to each other by ultrasonic welding.

(7) Since a ring-shaped protruding portion is formed on the case at the peripheral portion of the lower surface thereof and a ring-shaped groove engaging with the ring-shaped protruding portion is formed on the pole plate, it is possible to make the case easily weldable to the pole plate by ultrasonic welding and at the same time to improve air-tightness between the case and the pole plate.

(8) Since a displacement preventing groove is formed on the pole plate in a bottom surface portion of the ring-shaped groove, it is possible to prevent displacement when the pole plate is formed by extrusion with resin and, at the same time, to prevent resin in a part constituting the ring-shaped groove from melting and flowing inside and outside the pole plate.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An inhibitor switch comprising:
   a pole plate (1) in which fixed contact plates (2) are formed by insertion molding;
   a movable plate (3) having movable contacts (4), which are brought into contact with said fixed contact plates (2), said movable plate also having a shaft with multiple protrusions radially extending therefrom;
   a movable arm (8) secured to said movable plate (3); and
   a case (7) supporting pivotably said movable plate (3) together with said pole plate (1);
   wherein a bearing surface (2c) made of a metal plate is disposed in said pole plate (1) so as to be exposed to a bottom surface of a shaft hole (1b) to which the shaft (3b) of said movable plate (3) is pivotably fitted; and
   wherein a displacement preventing hole (3e, 3f) is formed on each end of said shaft (3a, 3b) of the movable plate (3) at a center of an end surface thereof.

2. The inhibitor switch according to claim 1, wherein said metal plate is integral with one of said fixed contact plates (2) disposed in said pole plate (1).

3. The inhibitor switch according to claim 2, wherein a shaft portion (8a) of said movable arm (8) is welded to the shaft (3a) of the movable plate (3) by ultrasonic welding, and a peripheral portion of the case (7) is secured to the pole plate (1) by ultrasonic welding.

4. The inhibitor switch according to claim 3, wherein said protruding portions (3c) on said movable plate (3) and recess portions (8b) on said movable arm (8) form a spline joint.

5. The inhibitor switch according to claim 4, wherein a ring-shaped protruding portion (7b) is formed on said case (7) at a peripheral portion of a lower surface thereof, and a ring-shaped groove (1e) engaging with said ring-shaped protruding portion (7b) is formed on said pole plate (1).

6. The inhibitor switch according to claim 5, wherein a displacement preventing groove (1f) is formed on said pole plate (1) in a bottom surface portion of said ring-shaped groove (1e).

7. The inhibitor switch according to claim 1, wherein a shaft portion (8a) of said movable arm (8) is welded to the shaft (3a) of the movable plate (3) by ultrasonic welding, and a peripheral portion of the case (7) is secured to the pole plate (1) by ultrasonic welding.

8. The inhibitor switch according to claim 7, wherein said protruding portions (3c) on said movable plate (3) and recess portions (8b) on said movable arm (8) form a spline joint.

9. The inhibitor switch according to claim 1, wherein a ring-shaped protruding portion (7b) is formed on said case (7) at a peripheral portion of a lower surface thereof, and a ring-shaped groove (1e) engaging with said ring-shaped protruding portion (7b) is formed on said pole plate (1).

10. The inhibitor switch according to claim 9, wherein a displacement preventing groove (1f) is formed on said pole plate (1) in a bottom surface portion of said ring-shaped groove (1e).

11. An inhibitor switch comprising:
    a pole plate in which fixed contact plates are formed by insertion molding;
    a movable plate having movable contacts which are movable into contact with said fixed contact plates, said movable plate also having a shaft with multiple protrusions radially extending therefrom;
    a movable arm secured to said movable plate having a blind hole for receiving said shaft, and recess portions, formed in an internal wall of said blind hole, to closely engage said radially extending protrusions to form a spline joint;
    a case pivotably supporting said movable plate, said case being welded together with said pole plate;
    a bearing surface made of a metal plate disposed in said pole plate so as to be exposed at a bottom surface of a shaft hole formed in said pole plate into which a shaft of said movable plate is pivotably fitted; and
    a displacement preventing hole formed on each end of said shaft of the movable plate at a center of an end surface thereof.

12. The inhibitor switch according to claim 11, wherein said metal plate is integral with one of said fixed contact plates disposed in said pole plate.

* * * * *